Patented May 13, 1924.

1,494,101

UNITED STATES PATENT OFFICE.

NELSON COX, OF BRINSON, GEORGIA, ASSIGNOR TO COTTON INDUSTRIAL CORPORATION, OF WILMINGTON, DELAWARE, A CORPORATION OF DELAWARE.

LIQUID SPRAY FOR BOLL WEEVILS.

No Drawing.    Application filed April 17, 1920.    Serial No. 374,733.

*To all whom it may concern:*

Be it known that I, NELSON COX, a citizen of the United States, and resident of Brinson, R. F. D., county of Decatur, and State of Georgia, have invented certain new and useful Improvements in Liquid Sprays for Boll Weevils, of which the following is a description.

This invention relates to liquid sprays for the protection of cotton against infestation by boll weevils, and has for its primary object to provide a simple and inexpensive spray solution which will not be injurious to the cotton plants, upon which the solution is sprayed.

More particularly the present invention consists in the admixture of kerosene and camphor in such relative proportions that when the solution is sprayed upon the cotton plants, the weevils are destroyed or driven off by the fumes, and remain away from the plants. Any weevils which may already infest the cotton bolls will be destroyed or driven off, as the solution is believed to attack the delicate and sensitive organs of the insect, or the composite odor is such as to be obnoxious to the weevils.

It is a further object of the invention to provide a spray which may be used in the ordinary spraying devices, and which spray can be supplied to the individual planter at nominal cost.

With the above and other objects in view, the invention consists in the improved spray solution, as will be hereinafter more particularly described and subsequently set forth in the appended claims.

In carrying out my invention, I add to five gallons of commercial kerosene one ounce of camphor, which may be either in the form of crude or refined camphor, ($C_{10}H_{16}O$). The camphor is soluble in the kerosene, and when sprayed or distributed upon the cotton plants, emits a distinct and characteristic odor into the atmosphere, which is a composite odor of the camphor and kerosene. The cotton plants are sprayed with the solution, which solution is distributed over and deposited on the said plants and the spray or vapor or mist or fumes enters or penetrates the forms, squares and blooms which may be growing thereon.

The odor is such as to drive away the weevil, and the odor is a combination of the camphor and kerosene constituents combined together.

It has also been determined that the addition of the camphor to the kerosene causes the higher volatile fraction of the kerosene to combine with the camphor, so that only the more volatile constituents will evaporate by the action of heat of the sun's rays, and the camphor and higher boiling fraction of the kerosene will remain unaffected by the heat, and the composite combination will provide an effective protector for the plant until the cotton bolls have reached a mature stage, when they can be gathered or harvested, it being commonly known that the weevil usually attacks the young plants.

From the foregoing description, the manner of producing the improved spray affording protection of plants against the presence, growth, development of foreign or parasitic living organisms, and more particularly for killing or exterminating or driving away the cotton boll weevil for reducing the infestation or incubation of the boll weevil or other insects, bugs or worms which feed upon or infest vegetable life, and the several advantages attendant upon its use, will be fully understood.

While I have found in practice, that the mixture of kerosene and camphor in relative proportions stated gives highly satisfactory results, it is, nevertheless, understood that such relative proportions are susceptible of some variation without liability of injury to the plant. So, for instance, the locality of the plants may determine a variation in the action of the plants in respect to the solution applied, since to some extent the chemical constituents of the soil may have an influence upon the texture of the parts of the plants exposed to the solution. The variety or species of the cotton seed may determine the individual nature of the cotton plants, which may require some modification in the spray for best results. Climate, humidity, moisture, relative variation of day and night temperatures, etc., may also be influential in respect to the relationship of the constituents of the solution, and lastly, slightly different species of the genus boll weevil or different ages thereof may be influenced in different manners by different variations of the respective constituents of the solution. Tests on the ground, that is, at the locality where the solution is to be applied, will readily enable the proportions to be varied, in a test batch, and then the larger quantities for general application can be gauged accordingly. So, in certain cases, the proportion of camphor to kerosene may be varied to some degree. I accordingly reserve the privilege of adopting all such changes and modifications as may be fairly embodied within the spirit and scope of the invention as claimed.

I claim:

1. A liquid spray for the destruction of boll weevils and the like, comprising a mixture of kerosene and camphor in which the camphor is combined with the kerosene and the mixture is adapted to be formed into a vapor or mist, the said mixture being adapted to be applied to the plants without injuring the same.

2. A liquid spray for boll weevils and the like, comprising a solution of approximately five gallons of kerosene mixed with approximately one ounce of camphor, the camphor being combined with the fractions of the kerosene and adapted to be applied in the form of a mist-like spray.

In testimony that I claim the foregoing as my invention, I have signed my name in presence of two subscribing witnesses.

NELSON COX.

Witnesses:
L. A. RAMAGE,
D. S. PETERS.